United States Patent
Prabhu et al.

(10) Patent No.: US 11,747,085 B2
(45) Date of Patent: Sep. 5, 2023

(54) SEALED TILT POUR ELECTRIC INDUCTION FURNACES FOR REACTIVE ALLOYS AND METALS

(71) Applicant: Inductotherm Corp., Rancocas, NJ (US)

(72) Inventors: Satyen Prabhu, Voorhees, NJ (US); Peter Aruanno, Hammonton, NJ (US)

(73) Assignee: Inductotherm Corp., Rancocas, NJ (US)

( * ) Notice: Subject to any disclaimer, the term of this patent is extended or adjusted under 35 U.S.C. 154(b) by 320 days.

(21) Appl. No.: 16/963,360

(22) PCT Filed: Jan. 22, 2019

(86) PCT No.: PCT/US2019/014523
§ 371 (c)(1),
(2) Date: Jul. 20, 2020

(87) PCT Pub. No.: WO2019/147560
PCT Pub. Date: Aug. 1, 2019

(65) Prior Publication Data
US 2020/0363131 A1    Nov. 19, 2020

Related U.S. Application Data

(60) Provisional application No. 62/620,550, filed on Jan. 23, 2018.

(51) Int. Cl.
*F27B 1/06* (2006.01)
*F27B 14/06* (2006.01)
(Continued)

(52) U.S. Cl.
CPC ............ *F27B 14/061* (2013.01); *F27B 14/02* (2013.01); *F27B 14/0806* (2013.01); *F27D 11/06* (2013.01)

(58) Field of Classification Search
CPC .......... F27B 14/02; F27B 14/04; F27B 14/06; F27B 14/061; F27B 14/08; F27B 14/0806;
(Continued)

(56) References Cited

U.S. PATENT DOCUMENTS 1,552,865 A    9/1925   Metzger
3,851,090 A    11/1974  Folgero et al.
(Continued)

FOREIGN PATENT DOCUMENTS

CN    110345760 A    10/2019
DE    1088194 B     9/1960
(Continued)

OTHER PUBLICATIONS

Otto Junker GmbH, Use of induction furnaces for melting and pouring copper materials, (C) 2009, pp. 1-87, Das Druckhaus Beineke Dickmanns GmbH, Korschenroich.

*Primary Examiner* — Hung D Nguyen
(74) *Attorney, Agent, or Firm* — Philip O. Post; Robert J. Everling (57) ABSTRACT

A sealed tilt pour electric induction furnace and furnace system is provided for supplying a reactive molten material from the furnace to a reactive molten material processing apparatus without exposing the reactive molten material to the ambient environment. The rotating component of a rotary union is connected to the furnace's enclosed furnace pour spout and rotates simultaneously with the tilt pour furnace about a common horizontally oriented rotational axis to supply the reactive molten material to the reactive molten material processing apparatus connected to the stationary component of the rotary union.

20 Claims, 5 Drawing Sheets

(51) Int. Cl.
*F27B 14/02* (2006.01)
*F27B 14/08* (2006.01)
*F27D 11/06* (2006.01)

(58) Field of Classification Search
CPC .......... F27B 14/12; F27B 14/20; F27D 11/06;
F27D 3/10; F27D 3/14; F27D 3/1509;
F27D 3/159; F27D 3/18
USPC .................................................. 373/142, 143
See application file for complete search history.

(56) References Cited

U.S. PATENT DOCUMENTS

| | | | |
|---|---|---|---|
| 3,917,241 A | 11/1975 | Steffora et al. | |
| 4,559,632 A | 12/1985 | Folgero | |
| 5,559,827 A * | 9/1996 | Shimada | F27D 1/1808 373/143 |
| 6,596,221 B1 | 7/2003 | Fuchs | |
| 9,332,594 B2 | 5/2016 | Holms et al. | |
| 2002/0130449 A1 | 9/2002 | Krause et al. | |
| 2006/0199125 A1 | 9/2006 | Evans | |
| 2013/0044785 A1* | 2/2013 | Holms | F27B 14/061 373/143 |
| 2015/0147227 A1* | 5/2015 | Tilak | C22C 21/06 373/142 |
| 2016/0242239 A1 | 8/2016 | Prabhu et al. | |

FOREIGN PATENT DOCUMENTS

| | | |
|---|---|---|
| DE | 2901763 A1 | 7/1979 |
| JP | S6252395 A | 3/1987 |
| JP | H06328221 A | 11/1994 |
| JP | 2000015402 A | 1/2000 |
| WO | WO 00/58680 A1 | 10/2000 |

* cited by examiner

SEALED TILT POUR ELECTRIC INDUCTION FURNACES FOR REACTIVE ALLOYS AND METALS

CROSS REFERENCE TO RELATED APPLICATIONS

This application claims the benefit of U.S. Provisional Application No. 62/620,550, filed Jan. 23, 2018, which is hereby incorporated by reference in its entirety.

FIELD OF THE INVENTION

The present invention relates to electric induction furnaces and furnace systems for heating and melting reactive alloys and metals and supplying molten reactive alloys and metals for use in industrial processes such as direct chill casting or mold filling lines where the poured reactive molten material is isolated from elements in an ambient environment such as oxygen in air.

BACKGROUND OF THE INVENTION

In the prior art, the pour spout in tilting electric induction furnaces is typically arranged with the spout oriented at an angle perpendicular (90 degrees) to the furnace's tilting axis as disclosed, for example, in U.S. Pat. No. 9,332,594 B2.

If a molten material requires a protective cover gas environment from air or other ambient environment, a tilt pour induction furnace can be located in a protective cover gas sealed vessel in which the pour is made. Other known apparatus and methods to protect the pouring region from air are complex and costly.

It is one object of the present invention to provide a tilt pour electric induction furnace and furnace system, and method of use thereof, that can supply molten reactive metals or metal alloys from a tilting electric induction furnace where the pour of molten reactive material from the furnace is protected from interaction with air or other ambient environment in a relatively cost-effective apparatus and method compared to those known in the art.

Other objects of the present invention are revealed in this specification and the appended drawings and claims.

BRIEF SUMMARY OF THE INVENTION

In one aspect the present invention is a tilt pour electric induction furnace and furnace system for heating, melting or the combination of heating and melting, a reactive metal or reactive metal alloy requiring isolation of the metal or the alloy from air or other ambient environment when delivering the molten metal or alloy from the furnace to a molten metal processing system.

In another aspect the present invention is a method of delivering a molten reactive metal or reactive molten metal alloy from a tilt pouring electric induction furnace and furnace system in which the reactive metal or reactive molten metal alloy is heated, melted or heated and melted while isolating the metal or alloy from air or other ambient environment during the pouring process and delivery to a molten metal processing system.

The above and other aspects of the invention are set forth in this specification and the appended drawings and claims.

BRIEF DESCRIPTION OF THE DRAWINGS

The appended drawings, as briefly summarized below, are provided for exemplary understanding of the invention, and do not limit the invention as further set forth in this specification and the appended claims.

FIGS. 3(*a*), 3(*b*), 3(*c*) and 3(*d*) illustrate exemplary upper tilt pour furnace vessel tilt positions about the rotational tilt pour axis of the furnace vessel when a sealed electric induction furnace system of the present invention is pouring reactive molten material from the furnace vessel or removing slag from the furnace vessel.

DETAILED DESCRIPTION OF THE INVENTION

Figure 1:
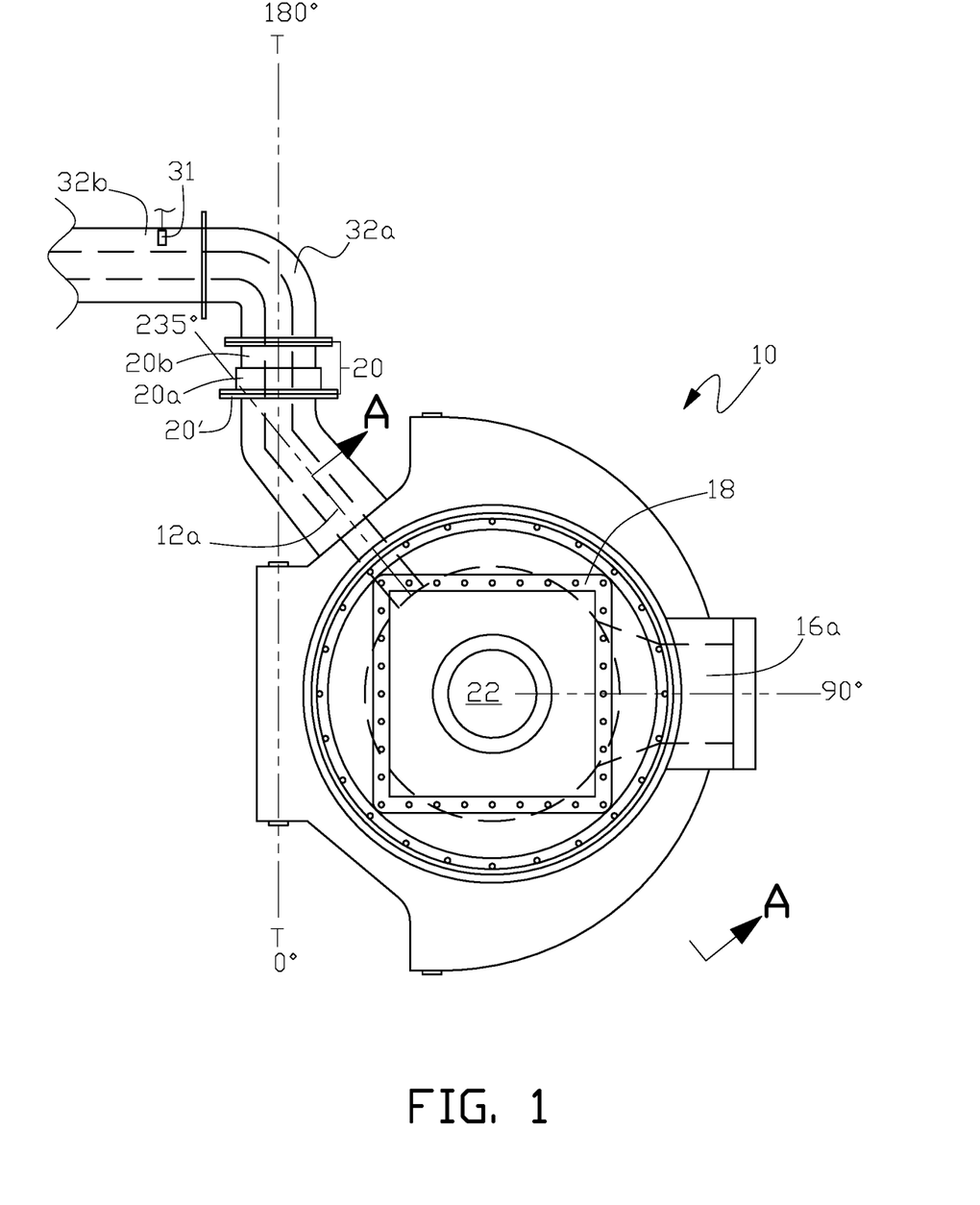
FIG. 1 is a top plan view of one example of an upper tilt pour furnace vessel of one embodiment of a tilt pour furnace system of the present invention and a sealed connection pour interface from the furnace system to a reactive molten material processing apparatus.
Figure 2:
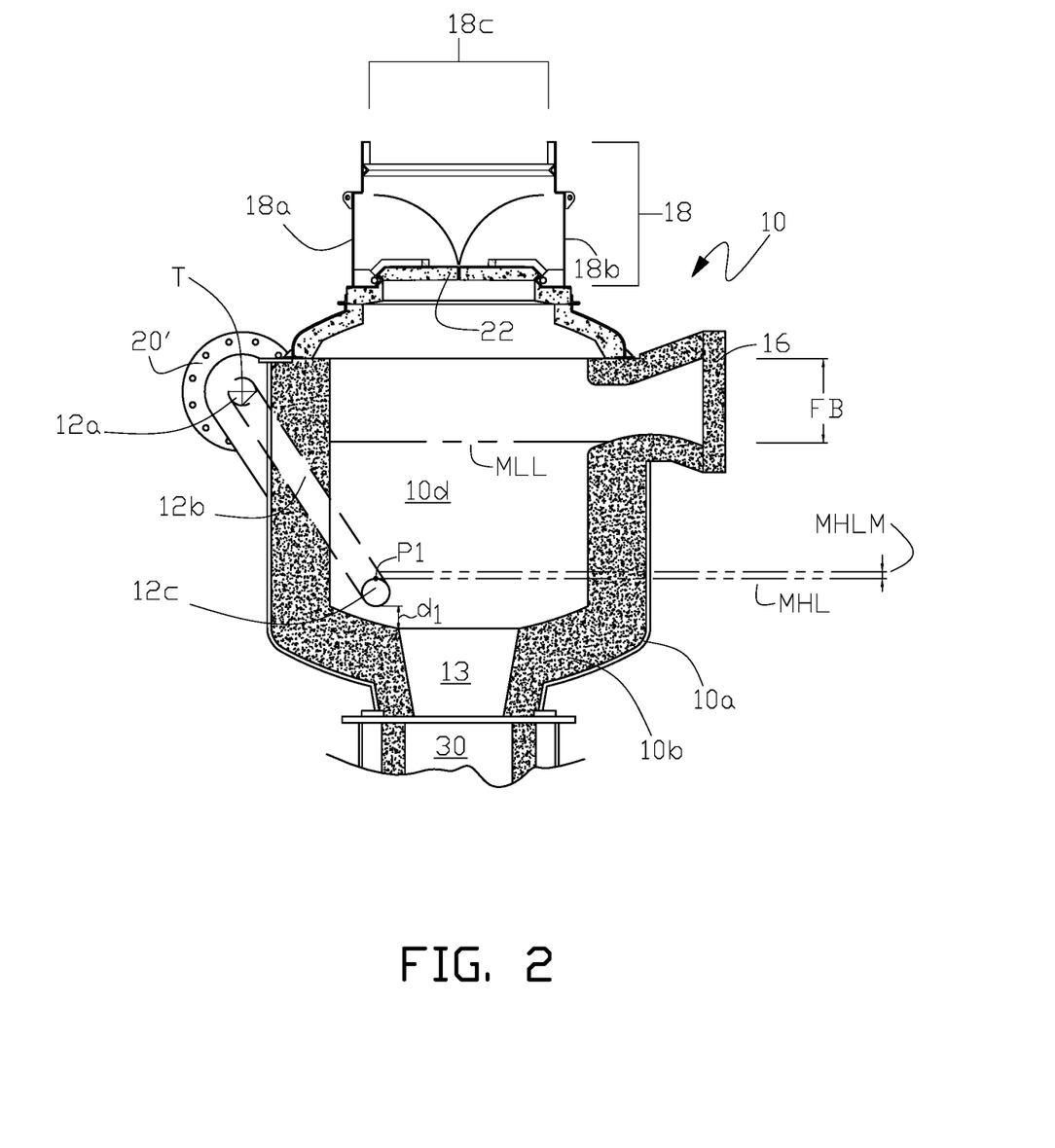
FIG. 2 is a cross sectional elevation view of the upper tilt pour furnace vessel shown in FIG. 1 through line A-A.

One example of an upper tilt pour furnace vessel 10 utilized in the present invention is illustrated in FIG. 1 and FIG. 2. The upper tilt pour furnace vessel is also identified as "the upper case" herein. In the illustrated embodiment of the invention, the upper tilt pour furnace vessel has outer structural shell 10*a* and inner refractory 10*b* selected from suitable materials known in the art to form a thermally insulated reactive material containment vessel. The volume within the refractory defines the typical upper case interior furnace volume 10*d* from a reactive material batch pour capacity line (exemplary MLL maximum load line in FIG. 2), with a cover gas freeboard volume (FB freeboard area in FIG. 2) above the reactive material load line, to an open throat molten metal region 13 at the bottom of the upper tilt pour furnace vessel 10, which connects the upper tilt pour furnace vessel 10 to a lower furnace vessel 30 in the illustrated exemplary embodiment of the invention.

In the embodiment of the invention shown in the drawings, the upper case's interior furnace volume 10*d* is generally cylindrical in shape from the top interior region to a bottom dish (or bowl) shaped region with a central bottom opening into throat molten material region 13.

Figure 4:
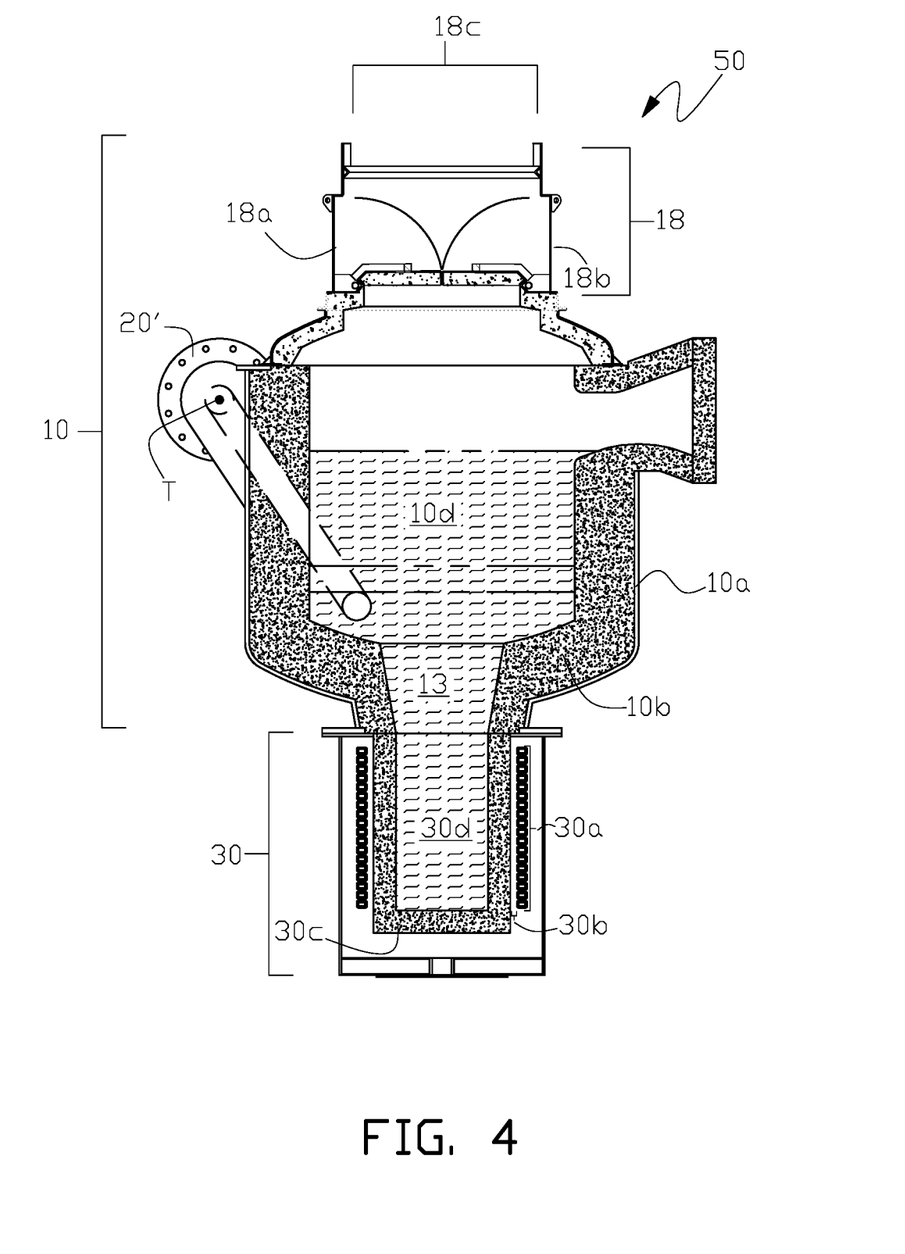
FIG. 4 illustrates one example of a lower electric induction furnace vessel connected to the upper tilt pour furnace vessel shown in FIG. 1 and FIG. 2 to form a sealed tilt pour electric induction furnace of the present invention.

FIG. 4 illustrates one example of a lower electric induction furnace vessel 30 as a coreless electric induction melting and heating furnace that forms, in combination with upper tilt pour furnace vessel 10, one embodiment of a sealed tilt pour electric induction furnace 50 of the present invention. The coreless electric induction melting and heating furnace may be as disclosed in United States Patent Application Publication No. 2016/0242239 A1 or otherwise known in the art depending upon a particular application.

A suitable alternating current power supply (not shown in the drawings) is provided to supply alternating current power to the inductor(s) 30*a*, as known in the art, in the electric induction furnace vessel 30 illustrated in FIG. 4 where reactive material 30*d* is shown in the electric induction furnace vessel. A cooling passage 30*b* may optionally be provided between inductor(s) 30*a* and refractory 30*c* in some embodiments of the invention as further disclosed in United States Patent Application Publication No. 2016/0242239 A1.

When an upper tilt pour furnace vessel of the present invention as described herein is used for pouring a reactive molten material, the lower electric induction furnace vessel is connected to the upper tilt pour furnace vessel as that shown in FIG. 4 and is tilted with the upper tilt pour furnace vessel. Although as described herein, the furnace and furnace system is also used in a furnace batch pour process, the furnace and furnace system of the present invention is used with multiple single pour reactive molten material processing apparatus for molten material processing systems such as mold filling lines.

In the embodiment of the invention shown in FIG. 1 and FIG. 2, the upper tilt pour furnace vessel 10 and the rotating component 20a of rotary union 20 are both configured for simultaneous rotation about a common trunnion shaft (or axis) "T-T" during a tilt pour of reactive molten material from enclosed furnace spout 12a protruding from the interior volume of the upper tilt pour furnace vessel typically at or above the reactive material batch pour capacity line in this embodiment of the invention. In the embodiment of the invention shown in the drawings, the upper tilt pour furnace vessel 10 (with attached lower furnace vessel 30) and the rotary union's rotating component 20a are simultaneously rotated with suitable drivers, for example powered linear drivers that create rotational motion, such as electric or hydraulic drivers as known in the art and illustrated, for example, in U.S. Pat. No. 9,332,594 B2. Rotary union 20 allows rotation of the tilt pour furnace to pour reactive molten material without exposure to the ambient environment between stationary reactive molten material processing apparatus 32a and 32b as illustrated in FIG. 1 via the rotary union's stationary component 20b (connected to processing apparatus 32a and rotating component 20a that is connected to enclosed furnace pour spout 12a to permit the flow of reactive molten material from the interior 10d of the upper tilt pour furnace vessel 10 to processing apparatus 32a and 32b that feed the reactive molten material to industrial process equipment (not shown in the drawings) such as direct chill casting or mold line filling process equipment. Rotary union 20, as known in the art, is selected according to a particular application of the present invention. Reactive molten metal material processing apparatus 32a and 32b represent one or more processing apparatus, for example enclosed metal launders as known in the art, to transfer the reactive molten material to a particular industrial process such as direct chill casting or a mold filling line.

Figures 3A, 3B, 3C, 3D:
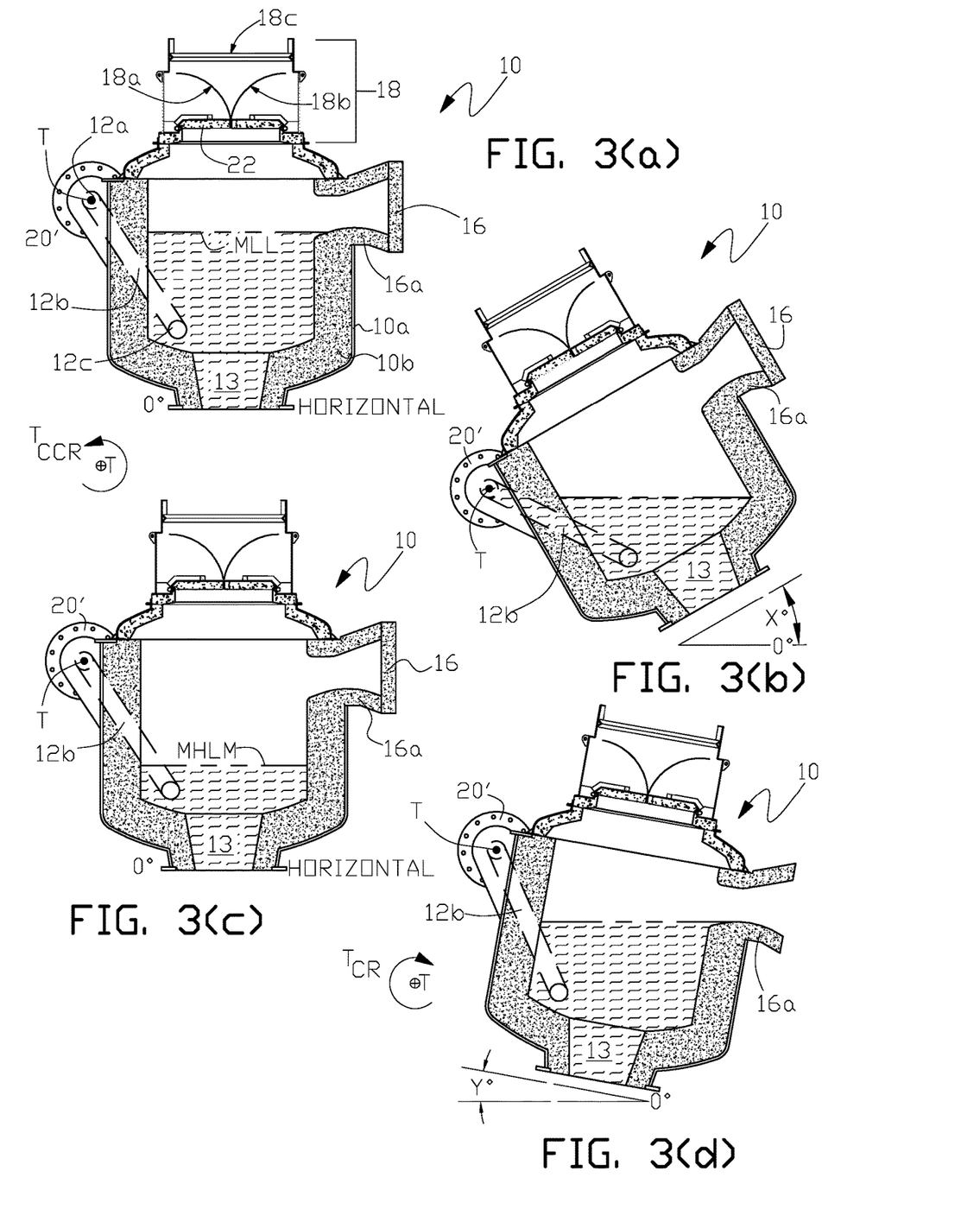

Enclosed furnace pour spout 12a extends from the outer circumference of the upper tilt pour furnace vessel 10 via an environment sealed connection to the upper tilt pour furnace vessel 10 and can be located, for example, at or above the maximum capacity horizontal reactive material load line (MLL) when the upper tilt pour furnace vessel is horizontally (non-pour) oriented as shown in FIG. 3(a) at 0 degrees (horizontal). In the embodiment of the invention shown in the figures, enclosed furnace pour spout 12a is fed molten reactive material via spout tube 12b that penetrates through the upper tilt pour furnace vessel's wall (outer structural shell 10a and inner refractory 10b in the illustrated embodiment) to the interior volume 10d of the upper tilt pour furnace vessel and terminates at interior spout tube opening 12c located near a lower circumference of the main interior volume 10d and above the transition interior molten material volume 13 between the upper tilt pour furnace vessel and lower electric induction furnace vessel. As shown in FIG. 2, interior spout tube opening 12c is located at distance $d_1$ above the transition interior volume in the embodiment of the invention shown in the drawings. Distance $d_1$ is selected in a particular application to maximize the volume of available batch pour molten material in the main interior volume 10d. Typically, but not limiting, the spout tube 12b may be of an open cylindrical cross sectional shape and the interior spout tube opening 12c, where the spout tube terminates, may be of an open oval cross sectional shape in the interior wall of the furnace. In general the spout assembly comprising enclosed furnace spout 12a, spout tube 12b and interior spout tube opening 12c draws molten reactive material from the lower main interior volume of the furnace to the enclosed furnace spout by gravity feed when the upper tilt pour furnace vessel (with attached lower electric induction furnace vessel) is rotationally tilted about furnace tilt trunnion shaft or axis "T-T".

As shown in FIG. 1, in the illustrated embodiment of the invention, enclosed furnace spout 12a is located approximately 235 degrees from the horizontally oriented furnace tilt rotational axis "T-T" (axially oriented 0-180 degrees) in the top planar view of the upper furnace vessel. In other embodiments of the invention the angular location of the enclosed furnace spout can vary as long as the angle is not perpendicular (90 degrees) to the furnace tilt rotational axis.

Reactive molten material passage from the tilt pour furnace is isolated from the ambient environment, for example air with oxygen content, from interior spout tube opening 12c sequentially through furnace spout tube 12b; enclosed furnace spout 12a, sealed rotating and stationary components of rotary union 20 connected to reactive molten material processing apparatus 32a (via flange 20' in the illustrated example) to deliver the reactive molten material to processing equipment in a particular application.

In a typical batch tilt pour process of the present invention illustrated in the drawings, when the upper furnace vessel 10 and connected lower furnace vessel 30 contain a sufficient quantity of specified reactive molten material for a batch pour of the reactive molten material from the upper furnace vessel, the upper furnace vessel 10 (with attached lower furnace vessel 30) and the rotational component 20a of rotary union 20 are rotated simultaneously about axis "T-T" while the stationary component 20b of rotary union 20 remains fixed. For the orientation of the embodiment of the invention shown in the drawings, rotation is counterclockwise $T_{CC}R$ rotation as show in the detail of FIG. 3(b) where counterclockwise rotation is X degrees from horizontal (zero degrees). Maximum tilt pour angle for the embodiment of the furnace system illustrated in the drawings is determined by the highest vertical point of spout tube opening 12c into the interior volume of the furnace; material in the upper furnace vessel is kept at least at the level (material heel line MHL in FIG. 2) of the highest point of opening 12c (point P1 in FIG. 2) to prevent oxygen, or other undesirable element in the ambient environment, from entering and combining with the reactive material in the furnace. To ensure this condition a tolerance low melt level, for example, two inches above the highest vertical point is maintained as a minimum melt level (MHLM) in FIG. 2 and FIG. 3(c)) in the furnace.

A laser (or other suitable) molten reactive material level sensor 31 can be provided in the reactive molten material processing apparatus 32a and/or 32b, such as an enclosed molten metal launder as known in the art, that are connected to the stationary component 20b of rotary union 20 in FIG. 1. In one embodiment of the invention, level sensor 31 in processing apparatus 32b can be arranged to sense a fixed specified molten reactive material flow height that is to be maintained in the processing apparatus during the batch pour (also referred to as "casting out") with output of the sensed level supplied to the rotational driver(s) rotating the furnace about axis "T-T" to change, or maintain, the rotational position as required to meet the fixed specified molten reactive material flow height (or rate of molten reactive material flow) to the molten reactive material industrial processing system connected to processing apparatus 32a and 32b in FIG. 1. In other embodiments of the invention, one or more laser sensors may be used in the enclosed furnace spout 12a and/or selected reactive molten material processing apparatus.

For the embodiment of the furnace and furnace system shown in the figures, clockwise rotation $T_{CR}$ about axis "T-T" rotates the upper furnace vessel (with attached lower furnace vessel) Y degrees from horizontal to remove top slag from the surface of the molten reactive material in the upper furnace vessel via slag chute 16a when slag door 16 is open as shown in FIG. 3(d). In the embodiment of the invention shown in the drawings slag door 16 is interlocked with an atmospheric purging system as known in the art to prevent introduction of oxygen or other undesirable element into the interior of the furnace vessel when the slag door is open.

The interior volume of the upper furnace vessel is preferably configured in a particular application so that when casting out a specified batch of molten reactive material from enclosed furnace spout 12a, sufficient molten material will remain in the interior volume of the lower furnace vessel to electromagnetically couple with the magnetic field generated by alternating current flow in the lower furnace vessel's inductor(s) 30a to avoid low load (molten material) impedance that can lead to overcurrent draw from the power supply that supplies alternating current to the inductor(s).

Cold start operation of a sealed pour tilt electric induction furnace of the present invention requires establishment of a minimum heel of a molten reactive material in the interior of the furnace. One method of establishing a minimum heel is by introducing a charge of reactive material into the furnace via optional charge load opening 18 located at top 22 of the upper furnace vessel. In other embodiments of the invention furnace top 22 may alternatively be a fixed top enclosure structure or a removable lid. The charge load opening is arranged to prevent loss of a cover gas environment within the interior volume of the furnace when charge is being loaded into the furnace.

In the embodiment of the invention shown in the drawings, charge load opening 18 comprises a charge environmental lock chamber that mates with a charge container (not shown in the drawings) to establish an environmentally sealed chamber with the charge container before the charge lock chamber allows opening of furnace top open doors 18a and 18b so that the environmentally-sealed mated charge container can release charge into the interior of the furnace via an opened furnace top 22 from the top 18c of the charge load opening.

In some embodiments of the invention a sealed charge bucket is used to prevent unnecessary addition of air to the system when adding charge to the upper furnace vessel. A sealed feeder can be provided to add charge via charge load opening 18. The charge feeder can be purged with a cover gas, such as argon, prior to adding the charge to the furnace system when placed on the top opening of the upper furnace vessel.

For a cold start, load charge can initially be inductively melted in the lower furnace vessel while continued loading of charge into the interior volume melts into the initially melted reactive material until a minimum level of heel is achieved.

The minimum level of heel to be maintained in the upper furnace vessel initially and after each batch pour (casting out) is above the interior spout opening 12c to prevent unwanted air (oxygen component) from entering the furnace vessel and causing a violent reaction with the reactive alloy or metal in the furnace vessel as further described herein.

Figure 5:
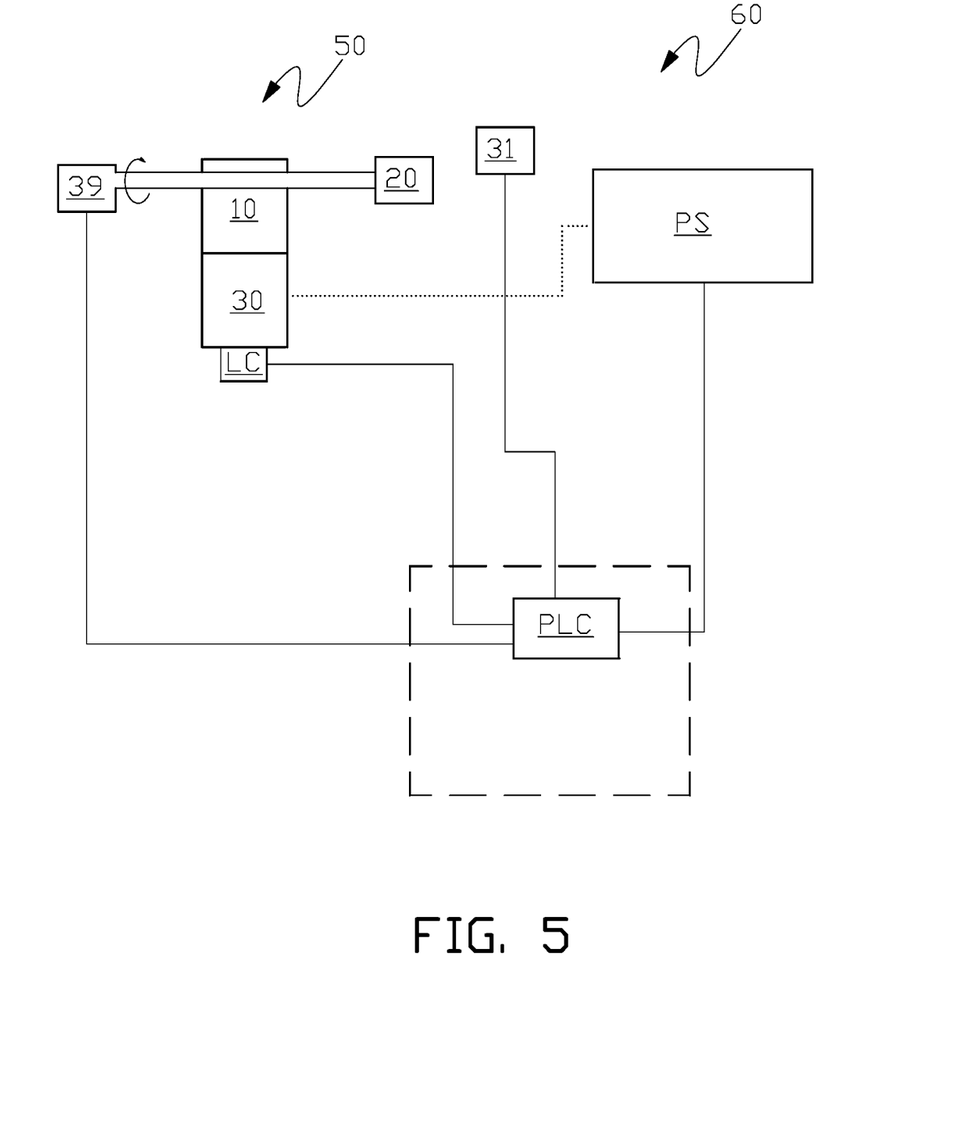
FIG. 5 is one example of a simplified furnace tilt control system diagram for a sealed tilt pour electric induction furnace and furnace system of the present invention.

FIG. 5 diagrammatically illustrates one example of a simplified constant volume batch melt delivery control system 60. Programmable logic controller (PLC) commands rotational drivers 39 to rotate furnace 50 (upper 10 and lower 30 furnace vessels) and the rotating component of rotary union 20 about tilt axis T-T to nominal furnace pour angle X degrees. Melt level sensor 31 reports level of melt flow in molten reactive material transport apparatus 32a and/or 32b to the PLC. In constant volume batch melt delivery mode, PLC commands rotational drivers 39 deviation from the nominal furnace pour angle X degrees to maintain constant volume (level) flow as reported by melt level sensor 31. Furnace load cell (LC) reports furnace weight to PLC to determine the quantity of charge being loaded to the furnace. An inclinometer is used to command counter pour rotation of rotation drivers 39 to return furnace 50 to horizontal orientation to satisfy minimum heel level of melt (by weight) in furnace 50. In the event of abnormal inductor 30a operation during tilt pour, power supply (PS) reports inductor fault to the PLC and the PLC commands rotational drivers 39 to return furnace 50 to the horizontal position in FIG. 2.

A cover gas handling and control system supplies a cover gas, for example argon, from a supply of the cover gas to the freeboard area (FB in FIG. 2) of the sealed tilt pour electric induction furnace of the present invention and the sealed charge feeder when provided via purge lines. In one embodiment of the invention the cover gas handling and control system comprises purge lines supplied through two independently managed cover gas handling and control subsystems. The systems include two oxygen monitoring sensors with a pump in each melt station. The oxygen monitor measures both the system's cover gas supply and exhaust to ensure that a level of oxygen is maintained throughout the charge feeder and furnace chamber under 0.1 percent oxygen. The atmosphere control system's sub-system brings oxygen concentration to below 0.1 percent oxygen within three minutes inside the atmosphere of the furnace and the charge feeder when the beginning point is atmospheric oxygen concentrating at approximately 21 percent.

In some embodiments of the invention a cover gas supply and handling system is optionally provided for enclosed external furnace spout 12a, rotary union 20 and/or the molten reactive material transport apparatus as required for a particular application.

The terms "reactive material" and "reactive molten material" are used to define a reactive metal or a reactive metal alloy, or a reactive molten metal or metal alloy, respectively. Generally the term "reactive" identifies a metal or metal alloy that reacts in an undesirable manner if exposed to a component of an ambient environment in which the furnace system is installed.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. An electric induction furnace system for a sealed tilt pouring of a reactive molten material, the electric induction furnace system comprising:
an upper tilt pour furnace vessel comprising a thermally insulated reactive material containment vessel, the upper tilt pour furnace vessel having a horizontally oriented rotational tilt axis;
a lower electric induction furnace vessel connected to the upper tilt pour furnace vessel and in fluid communication with the upper tilt pour furnace vessel, the lower electric induction furnace vessel configured to inductively heat and melt a reactive material charge loaded into the upper tilt pour furnace vessel;
an enclosed furnace pour spout configured to pour the reactive molten material from the upper tilt pour furnace vessel when the upper tilt pour furnace vessel is tilted about the horizontally oriented rotational tilt axis to a pour position with the enclosed furnace pour spout angularly located other than being perpendicular to the horizontally oriented rotational tilt axis; and
a rotary union having a rotating union component and a stationary union component, the rotating union component connected to the enclosed furnace pour spout and axially aligned with the horizontally oriented rotational tilt axis for rotation about the horizontally oriented rotational tilt axis when the upper tilt pour furnace vessel is tilted for transfer of the reactive molten material from the enclosed furnace pour spout to a reactive molten material processing apparatus connected to the stationary union component.

2. The electric induction furnace system of claim 1 where the enclosed furnace pour spout is fed the reactive molten material from an interior spout tube opening disposed near a lower circumference of a main interior volume of the upper tilt pour furnace vessel through a spout tube penetrating through a wall of the main interior volume.

3. The electric induction furnace system of claim 2 where the enclosed furnace pour spout is disposed at a horizontal angle of 235 degrees when the horizontally oriented rotational tilt axis is axially oriented 0-180 degrees.

4. The electric induction furnace system of claim 1 further comprising a molten reactive material level sensor disposed in the reactive molten material processing apparatus to adjust the pour position responsive to a reactive molten material flow height or a reactive molten material rate of flow at the molten reactive material level sensor in the reactive molten material processing apparatus.

5. The electric induction furnace system of claim 1 further comprising a slag door opening disposed in the upper tilt pour furnace vessel configured for removal of a slag material from the slag door opening when the upper tilt pour furnace vessel is tilted about the horizontally oriented rotational tilt axis in a rotational direction counter to a pour position rotational direction.

6. The electric induction furnace system of claim 1 further comprising a charge lock chamber disposed at a top of the upper tilt pour vessel for supply of the reactive material charge to an interior of the upper tilt pour furnace vessel.

7. A method of supplying a reactive molten material from an electric induction furnace system to a reactive molten material processing apparatus, the method comprising:
charging an upper tilt pour furnace vessel with a reactive material, the upper tilt pour furnace vessel connected to a lower electric induction heating furnace vessel;
inductively heating and melting the reactive material in the lower electric induction heating furnace vessel;
tilting the upper tilt pour furnace vessel about a horizontally oriented rotational tilt axis to a pour position to pour the reactive molten material from an enclosed furnace pour spout connected to an interior of the upper tilt pour furnace vessel with the enclosed furnace pour spout angularly located other than being perpendicular to the horizontally oriented rotational tilt axis; and
rotating a rotating union component of a rotary union about the horizontally oriented rotational tilt axis simultaneously with tilting the upper tilt pour furnace vessel about the horizontally oriented rotational tilt axis to the pour position to transfer the reactive molten material from the enclosed furnace pour spout to a stationary union component of the rotary union connected to the reactive molten material processing apparatus.

8. The method of claim 7 further comprising feeding the reactive molten material to the enclosed furnace pour spout from the interior of the upper tilt pour furnace vessel via an interior spout tube opening disposed near a lower circumference of the interior of the upper tilt pour furnace vessel through a spout tube penetrating through a wall of the interior of the upper tilt pour furnace vessel.

9. The method of claim 8 further comprising orienting the enclosed furnace pour spout at a horizontal angle of 235 degrees with the horizontally oriented rotational tilt axis axially oriented 0-180 degrees.

10. The method of claim 7 further comprising sensing a reactive molten material flow height or a reactive molten material rate of flow in the reactive molten material processing apparatus when the upper tilt pour furnace vessel is in the pour position and adjusting the pour position response to a change in the reactive molten material flow height or the reactive molten material rate of flow.

11. The method of claim 7 further comprising tilting the upper tilt pour furnace vessel about the horizontally oriented rotational tilt axis in a direction counter rotational to a pour position tilt for a slag removal from the upper tilt pour furnace vessel.

12. A method of supplying a batch pour of a reactive molten material from an electric induction furnace system to a sealed reactive molten material processing apparatus, the method comprising:
charging an upper tilt pour furnace vessel with a reactive material by a charge environmental lock chamber disposed at a top of the upper tilt pour furnace vessel, the upper tilt pour furnace vessel connected to a lower electric induction heating furnace vessel;
inductively heating and melting the reactive material in the lower electric induction heating furnace vessel while charging the upper tilt pour furnace vessel until the reactive molten material reaches a maximum load line in an interior volume of the upper tilt pour furnace vessel;
maintaining a cover gas in a freeboard volume above the reactive molten material in the upper tilt pout furnace vessel;
tilting the upper tilt pour furnace vessel about a horizontally oriented rotational tilt axis to a variable pour angle position to pour the batch pour of the reactive molten material from an enclosed furnace pour spout connected to the interior volume of the upper tilt pour furnace vessel with the enclosed furnace pour spout angularly located other than being perpendicular to the horizontally oriented rotational tilt axis; and
rotating a rotating union component of a sealed rotary union about the horizontally oriented rotational tilt axis simultaneously with tilting the upper tilt pour furnace vessel about the horizontally oriented rotational tilt axis to the variable pour angle position to transfer the reactive molten material from the enclosed furnace pour spout to the sealed reactive molten material processing apparatus via the rotary union component and a stationary union component of the sealed rotary union.

13. The method of claim 12 further comprising feeding the reactive molten material to the enclosed furnace pour spout from the interior volume of the upper tilt pour furnace vessel via an interior spout tube opening disposed near a lower circumference of the interior volume of the upper tilt pour furnace vessel through a spout tube penetrating through a wall of the interior volume of the upper tilt pour furnace vessel.

14. The method of claim 13 further comprising maintaining a minimum level of a reactive molten metal heel above the interior spout tube opening during the method of supplying the batch pour of the reactive molten material from the electric induction furnace system.

15. The method of claim 14 further comprising orienting the enclosed furnace pour spout at a horizontal angle of 235 degrees with the horizontally oriented rotational tilt axis axially oriented 0-180 degrees.

16. The method of claim 15 further comprising sensing a reactive molten material flow height in the sealed reactive molten material processing apparatus when the upper tilt pour furnace vessel is in the variable pour position and adjusting the variable pour position responsive to a change in the reactive molten material flow height to maintain a constant reactive molten material flow height in the sealed reactive molten material processing apparatus.

17. The method of claim 15 further comprising sensing a reactive molten material rate of flow in the sealed reactive molten material processing apparatus when the upper tilt pour furnace vessel is in the variable pour angle position and adjusting the variable pour angle position responsive to a change in the reactive molten rate of flow to maintain a constant reactive molten material rate of flow in the sealed reactive molten material processing apparatus.

18. The method of claim 13 further comprising tilting the upper tilt pour furnace vessel about the horizontally oriented rotational tilt axis in a direction counter rotational to the variable pour angle position tilt for a slag removal from the upper tilt pour furnace vessel.

19. The method of claim 13 further comprising maintaining the cover gas in the sealed reactive molten material processing apparatus via the sealed rotary union when supplying the batch pour of the reactive molten material from the electric induction furnace system.

20. The method of claim 13 further comprising maintaining the cover gas in the freeboard volume with the charge environmental lock chamber when a charge container is connected to the charge environmental lock chamber.

* * * * *